United States Patent Office 3,173,714
Patented Mar. 16, 1965

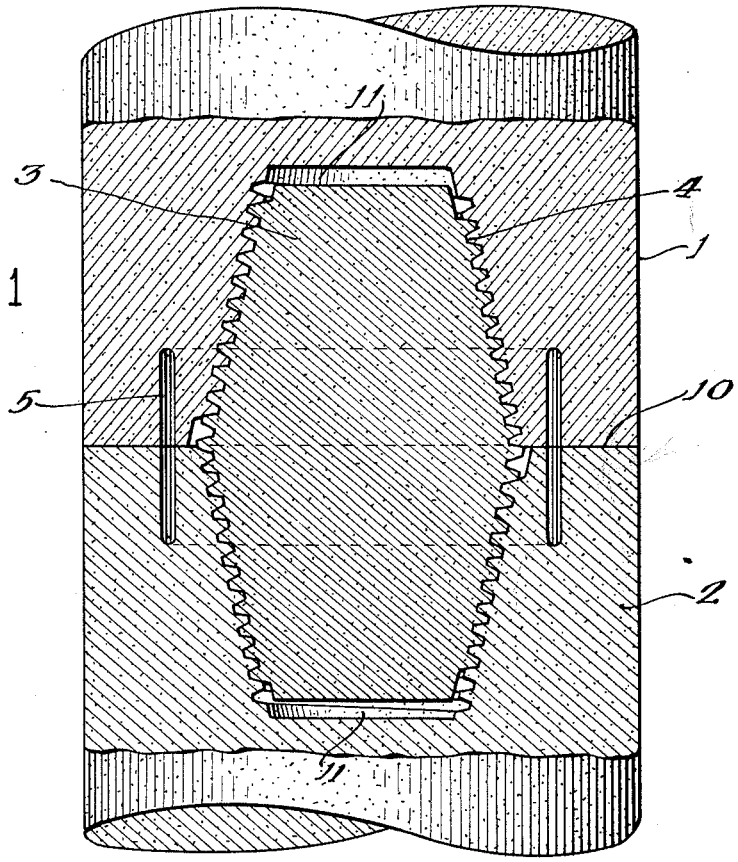
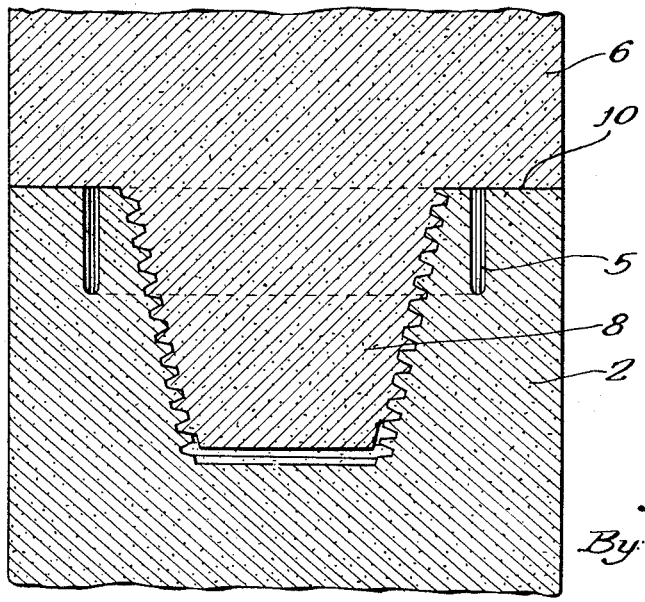

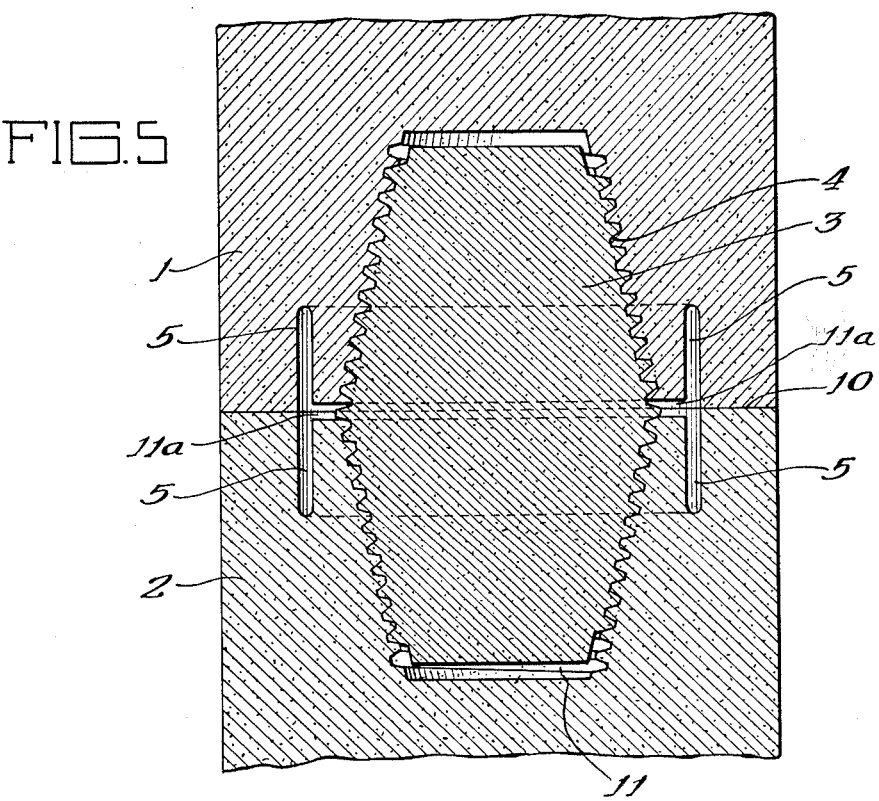
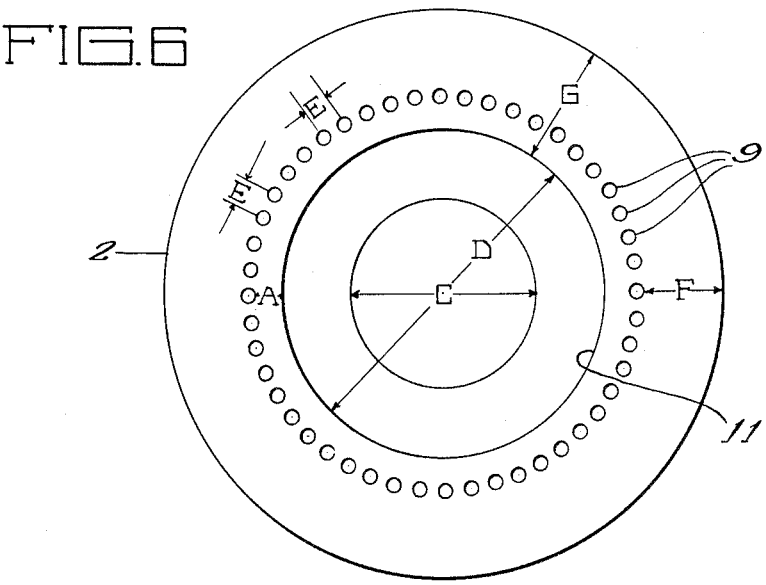

3,173,714
CARBON OR GRAPHITE ELECTRODE JOINT
James H. Whitwell, Lockport, N.Y., assignor to Great Lakes Carbon Corporation, New York, N.Y., a corporation of Delaware
Filed Nov. 5, 1962, Ser. No. 235,344
8 Claims. (Cl. 287—127)

This invention relates to means for improving the performance of furnace electrodes employing conventional electrode joint assemblages.

In conventional electrode joint assemblages employing threaded male-female type electrode sections, or threaded female-type electrode sections coupled together with threaded nipples, mechanical stresses are induced in the electrode sections or in the nipple by the torque applied in tightening the joint. These stresses are increased in magnitude by other forces due to supporting the weight of the electrode train, tilting the furnace, falling scrap, etc. Due to the employment of threaded connections between the electrode sections, or the electrode sections and the nipple, high stress concentrations are located on the first load bearing threads nearest the joint. It has been observed that nipple failures generally occur at this point, as do failures in the male member between male and female electrode sections.

The object of this invention is to increase the effective strength of connected electrode sections by reducing the stress concentrations at the load bearing threads nearest the electrode section joints.

It is a finding of this invention that the effective strength of connected electrodes may be considerably improved if stress relief means are provided in one or both of the electrodes which are coupled together; the nature and positioning of said stress relief means being described in detail in the following specification, and illustrated in the attached drawings wherein:

FIGURE 1 is a vertical sectional view of two electrode sections connected together by a nipple;

FIGURE 2 is a vertical sectional view of connected male-female electrode sections;

FIGURE 5 is, like FIG. 1, a vertical sectional view of two electrode sections connected together by a nipple, but employing a modification thereof with respect to socket face relief; and FIGURE 6 is a diagrammatic horizontal sectional view similar to that of FIG. 4, but illustrating an alternative variation of the invention.

Figure 3:
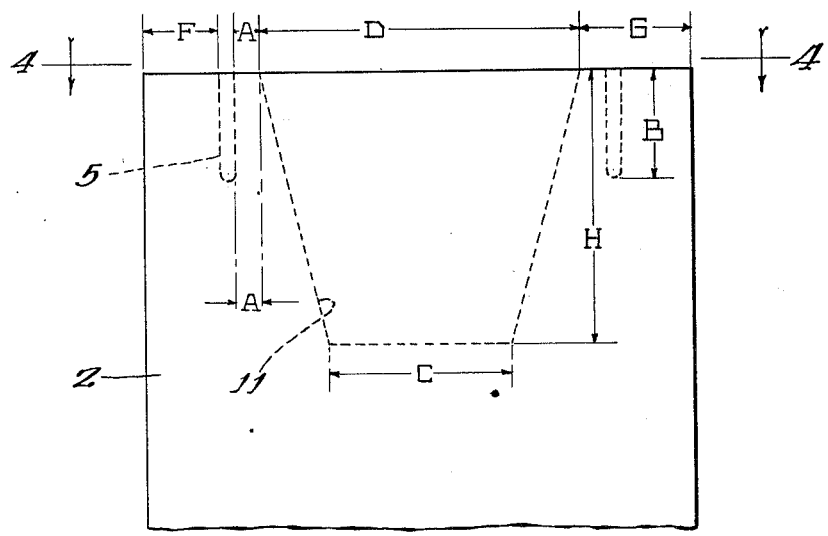
FIGURE 3 is a diagrammatic vertical sectional view of one of the electrode sections of FIG. 1.

Referring now to these figures in more detail, and particularly FIG. 1, electrode section 1 is coupled together with female type electrode section 2 by means of nipple 3. Nipple 3 is threaded into threaded sockets (sockets are designated as 11, see FIG. 3) in each of the electrode sections, and, when the electrode sections are tightened, they meet at joint 10. The nipple will typically be tapered and have a major diameter or maximum transverse dimension at the joint, and a minor diameter or minimum transverse dimension at the base of the socket. These are designated as dimensions "D" and "C" respectively in FIG. 3. Nipple 3 may also be of uniform diameter or transverse dimension throughout its length. In any case, most of the stress on the nipple threads from the electrode sections occurs on the threads close to or nearest the joint 10. Although the major diameter of the nipple is variable, the diameter of the electrode sections which are joined is always larger, so that portions of the faces of the electrode sections being joined come in direct contact with each other, in the electrode section face area between the socket and the outer wall of the electrode. This electrode section face area is designated as "G" in FIG. 3.

Figure 4:
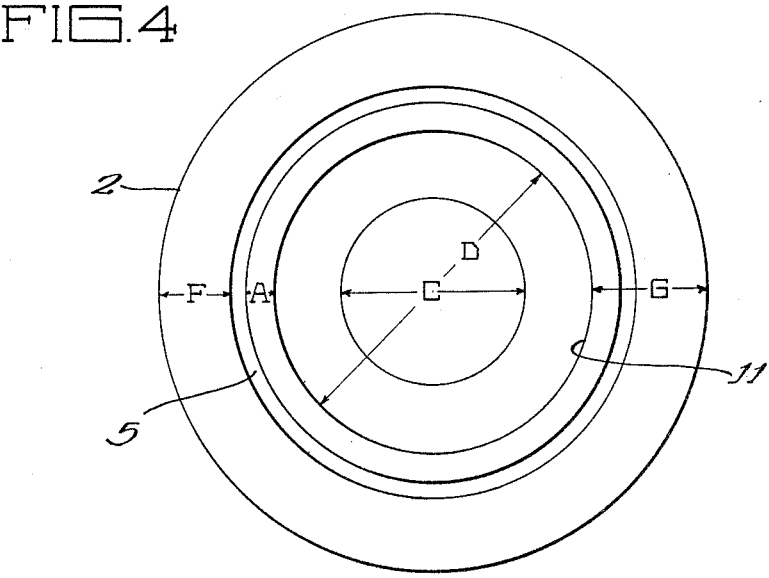
FIGURE 4 is a diagrammatic horizontal sectional view taken across the line 4—4 of the electrode section of FIG. 3.

What has been described thus far is conventional in the electrode art. However, in accordance with the present invention, stress relief means such as a groove or annulus 5 (see FIG. 4), or drilled holes 9 (see FIG. 6), are provided (in the female type electrode sections which are to be joined) between the face D of the socket and the outer wall of the electrode section. These stress relief means are provided between about ⅙ to about ½ the radial distance from the boundary socket face (or the major diameter of the nipple), to the outer boundary which terminates at the outer surface of the electrode. This distance is designated as "A" in FIG. 3 while the total distance from the major diameter of the nipple to the outer surface of the electrode is designated as "G." "F" is the distance between the outer surface of the electrode and the outer boundary of the stress relief means (or groove or pattern etc.) and is generally greater than distance "A." The stress relief means (such as groove 5 or holes 9) extend from the face of the electrode section inwardly into the section a distance "B" which is typically from about ¼ to about ½ the depth "H" of the socket in said section.

If the stress relief means employed consists of an annular groove 5, it is preferably kept as narrow as practical for machining in order not to reduce the face contact area more than necessary. Its width will typically vary between ¹⁄₃₂ inch and ½ inch depending on the diameter of the electrode sections being joined—with the width typically increasing as the diameter of the electrode sections being joined increases. A typical diameter of the groove is from about ½ inch to 1½ inch larger than the major diameter of the socket, although this too will vary depending on the diameter of the electrode sections being joined. A radius at the bottom of the groove is preferred to sharp machined edges.

If a series of holes are employed as the stress relief means or mechanism rather than an annular groove, they typically are drilled on a circle having a diameter ½ inch to 1½ inch greater than the major diameter of the socket. Such holes typically are ⅛" to ¼" in diameter and also extend inwardly into the electrode section a distance "B" which is typically from about ¼ to about ½ the depth "H" of the socket in said section. The spacing "E" between the holes varies from one to three times the diameter of the holes. The holes will usually be of uniform diameter.

As previously indicated the invention is applicable to connections between male-female type sections, as illustrated in FIG. 2, or to connections between female type electrode sections joined by a nipple as illustrated in FIG. 1.

If the connection is of the male-female electrode section type, the stress relief means 5 or 9 are provided in the face of the female electrode section 2 which contains the threaded socket. The male electrode section 6 contains a threaded stud portion 8 which connects into the socket. Male electrode section 6 possesses a horizontal shoulder—which abuts against area "G" of the face of the female electrode section, and forms the joint 10 therewith.

If the connection is between female type electrode sections by means of a nipple, as illustrated in FIG. 1, stress relief means (such as groove 5 or holes 9) are typically provided in each of said sections and they preferably also "register" with each other. By the term "register" is meant, in the case of annular grooves, that they have identical diameters and directly face each other; in the case of the drilled holes it means that the holes were drilled on the same diameters but that the holes do not necessarily face each other. "Registering" opposed annular kerf stress relief means 5 are illustrated in FIG. 1.

FIGURES 5 illustrates a modification of the type of joint shown in FIG. 1. In this embodiment the faces of the female electrode sections are relieved slightly in the area ("A") between the stress relief groove 5 and the electrode section sockets. This additional face relief is designated as 11a and helps to distribute and direct the tensile load more favorably over the entire length of the nipple. The depth of this additional electrode face relief 11a typically varies from 0.005 inch to 1/16 of an inch in each of the female electrode sections which are joined.

The embodiment illustrated in FIG. 1, which has more "face to face" surface area contact and hence better resistance characteristics, will generally be employed in preference to the FIG. 5 alternative whenever resistance characteristics are of prime consideration. However, the FIG. 5 embodiment may be preferred if stress relief is of prime consideration.

The stress relief means are typically substantially hollow, viz contain nothing therein except perhaps some residual carbon or graphite dust left after the kerfing or drilling steps carried out on the electrode sections to produce the stress relief mechanism. However, the use or placement of loose granular carbonaceous or graphite powder within said stress relief means is considered to be within the scope of the invention, so long as any such material placed therein does not bond the faces of the electrode sections together. Such bonding would impair or destroy the functioning of the stress reducing means.

The invention and its advantages are illustrated by the following typical examples.

*Example 1*

Two female electrode sections were joined together in a manner as illustrated in FIG. 1, employing a tightening torque of 100 ft./lbs. The electrode sections were 36 inches long, 6 inches in diameter and possessed sockets which were 2¾ inches deep (dimension H), had major diameter (dimension D) of 3⅝ inches and minor diameters (dimension C) of 2½ inches. The sections possessed annular kerfs 5 which were 7/32 inch (distance A) away from the major diameters of the sockets or the socket faces. The annular kerfs were each 1 inch deep, and 7/16" wide with a radius of 7/32" at the bottom. The bending moment at failure of the joint was 22,300 in.-lbs.

*Example 2*

Example 1 was repeated seven more times with other electrode sections and also with some varying of the distance of the annular kerfs from the socket faces (distance A) from 7/32" to 12/32". The average bending moment at failure of the joint was 21,600 in.-lbs.

*Example 3*

Example 1 was exactly repeated five times but with no stress relief means in either of the femal electrode sections. In other words a standard type joint was employed. The average bending moment at failure of the joint was 17,900 in.-lbs.

*Example 4*

Example 1 was repeated three times but the depth of the groove in each of the electrode sections was changed to 1½ inch. The distance ("A") of the groove from the major dimension of the socket was, on the other hand, reduced, and was varied between 3/32 inch and 5/32 inch. The average bending moment at failure of the joint was 19,300 in.-lbs.

*Example 5*

Example 1 was repeated with the faces of the electrode sections each relieved 1/16" in the area between groove and socket, such as illustrated in FIG. 5. The bending moment at failure of this stress relieved socket joint was 24,000 in.-lbs.

Comparable improved strengths were obtained when employing other embodiments of the invention such as the male-female type joint illustrated in FIG. 2, the drilled holes illustrated in FIG. 6, other depths and positionings of the stress reducing means, etc.

Although I have described my invention with a certain degree of particularity, it is understood that the present disclosure has been made only by way of example and that numerous changes in the details of construction may be resorted to without departing from the spirit and the scope of the invention as hereinafter claimed.

I claim:

1. In a connecting joint between sections of an electric furnace electrode comprising electrode sections, and a nipple threaded into a socket in each section holding abutting faces of said sections in contact, the improvement comprising stress relief means located in each of said sections, said stress relief means being positioned substantially concentrically with the electrode circumference and being situated between about ⅙ to about ½ the distance from the inner surface of the socket at its major diameter to the outer surface of the electrode, and said stress relief means extending from the faces of the electrode sections inwardly into each section a distance of from about ¼ to about ½ the depth of the socket in said section.

2. In a connecting joint between sections of an electric furnace electrode comprising electrode sections, and a nipple threaded into a socket in each section holding abutting faces of said sections in contact, the improvement comprising registering stress relief means located in each of said sections, said registering stress relief means being positioned substantially concentrically with the electrode circumference and being situated between about ⅙ to about ½ the distance from the inner surface of the socket at its major diameter to the outer surface of the electrode, and said registering stress relief means extending from the faces of the electrode sections inwardly into each section a distance of from about ¼ to about ½ the depth of the socket in said section.

3. In a connecting joint according to claim 2 wherein the stress relief means which register with each other are opposing annular kerfs.

4. In a connecting joint according to claim 1 wherein the stress relief means in each of said sections is a circular series of holes ⅛" to ¼" in diameter, the spacing of the holes varying from one to three times the diameter of the holes.

5. In a connecting joint according to claim 1 wherein the abutting faces of each of the electrode sections are relieved slightly in the area between the stress relief means and the socket.

6. In a connecting joint according to claim 3 wherein the width of said annular kerfs is from about 1/32" to about ½".

7. In a connecting joint between sections of an electric furnace electrode comprising electrode sections one of which possesses a threaded socket by means of which another electrode section is coupled to same directly by means of a male-female type joint, the improvement comprising stress relief means located in said section which possesses the threaded socket, said stress relief mean being positioned substantially concentrically with the electrode circumference and being situated between about ⅙ to about ½ the distance from the inner surface of the socket at its major diameter to the outer surface of the electrode, and said stress relief means extending from the face of the electrode section inwardly into the section a distance of from about ¼ to about ½ the depth of the socket in said section.

8. In an electrode section which possesses a threaded socket, the improvement comprising stress relief means located in said section, said stress relief means being positioned substantially concentrically with the electrode circumference and being situated between about ⅙ to about ½ the distance from the inner surface of the socket at its major diameter to the outer surface of the electrode, and said stress relief means extending from the face of the electrode section inwardly into the section a distance of from about ¼ to about ½ the depth of the socket.

References Cited in the file of this patent

UNITED STATES PATENTS 2,527,294    Bailey ------------------ Oct. 24, 1950